Nov. 17, 1959 R. K. BAILEY 2,913,247

PHONOGRAPH RECORD AND PLAYING SYSTEM THEREFOR

Filed April 30, 1956

Inventor
Reginald K. Bailey
by
Mason, Kolehmainen, Rathburn and Wyss.
Attorneys.

United States Patent Office 2,913,247

Patented Nov. 17, 1959

2,913,247

PHONOGRAPH RECORD AND PLAYING SYSTEM THEREFOR

Reginald K. Bailey, Wilmette, Ill.

Application April 30, 1956, Serial No. 581,459

1 Claim. (Cl. 274—42)

The present invention relates to phonograph records and playing systems therefor and has for a primary object the provision of a new and improved record and record player arrangement whereby the listener is audibly reminded to change the record after the recorded selection has been completed.

In many instances of playing phonograph records the phonograph needle is left on the record after the recorded selection has been played and no indication of such condition is provided. This situation occurs frequently in the case of children's record players which are generally of the non-automatic type and require the needle to be lifted off the record and the record manually changed after the recorded selection has been played. With such record players the listener may become interested in other activities and leave the room with the result that the record player continues to run with the phonograph needle in engagement with the endless groove which is usually provided at the center of the record and the needle rapidly becomes unsatisfactory for proper reproduction. This condition may continue for several hours before being discovered and corrected since the needle scratch in this endless groove is usually very low and in many instances the cover of the record player is closed so that a person in the room cannot even see the rotating turntable of the record player.

It is, therefore, a further object of the present invention to provide a new and improved phonograph record and record playing system wherein an audible reminder message is automatically produced after the recorded selection has been played to remind persons within earshot that the record should be changed.

It is a still further object of the present invention to provide a new and improved phonograph record and record playing system wherein an audible reminder message is automatically repeated after the recorded selection has been played to remind the listener that the record should be changed.

It is another object of the present invention to provide a new and improved phonograph record which is adapted continuously and repetitively to produce a reminder message after the selection recorded on the record has been played.

It is a further object of the present invention to provide a new and improved phonograph record which is provided with a run-out groove following the selection recorded on the record and is adapted continuously and repetitively to produce an audible reminder message after the run-out groove has been traversed.

Briefly, in accordance with one aspect of the invention the phonograph record is provided with an endless groove following the end of the selection recorded on the record and a reminder message is recorded in this endless groove, this reminder message being of sufficiently short duration that it is completed within one revolution of the record. After the selection has been played the phonograph needle engages the endless groove and the reminder message recorded therein is repeated each revolution of the record. The reminder message is thus audibly reproduced by the same equipment used in reproducing the recorded selection and is continuously repeated until the phonograph needle is lifted off the record so that the listener is continuously reminded that the record should be changed. In accordance with a further aspect of the invention, the endless reminder message groove is spaced radially inwardly from the end of the recorded selection and is connected thereto by means of a run-out groove which is designed to actuate the tripping mechanism of an automatic record changer so that the record is changed before the needle encounters the reminder message groove when the record is played on an automatic record changer, but the reminder message is repetitively reproduced by the needle if the record is played on a manual record player or on an automatic record player which is adjusted to the manual play position.

The invention, both as to its organization and method of operation, together with further objects and advantages thereof, will best be understood by reference to the following specification taken in connection with the accompanying drawing in which.

Figures 1, 2, 3, 4, 5:
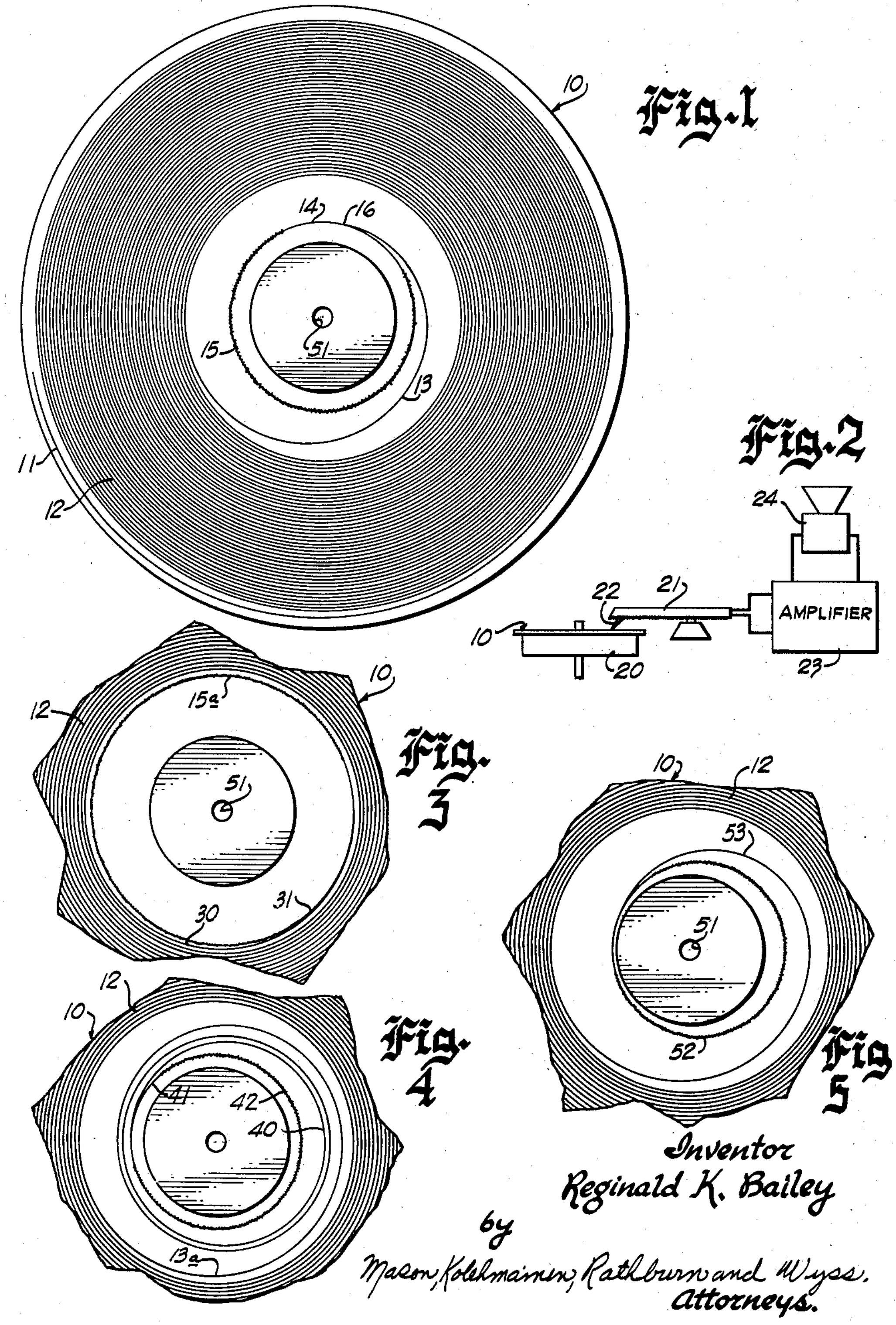
Fig. 1 is a plan view of a phonograph record embodying the features of the present invention.
Fig. 2 is a schematic diagram of a phonograph record playing system wherein the phonograph record of Fig. 1 is utilized.
Figs. 3, 4 and 5 are fragmentary plan views of phonograph records embodying alternative arrangements of the invention.

Referring now to the drawing, and, more particularly, to Fig. 1 thereof, the phonograph record of the present invention is therein illustrated as comprising a phonograph record disc 10 having a conventional lead-in groove 11 which is connected to a spiral groove portion 12 having recorded therein the selection which is to be reproduced. The record groove 12 constitutes a first recorded portion on the record 10 and the selection may be recorded in any desired manner and with any desired spacing between the grooves insofar as the present invention is concerned. At the end of the first recorded portion 12 there is provided a run-out groove 13 which is connected to an endless groove 14 spaced radially inwardly from the recorded portion 12.

In accordance with the present invention the endless groove 14 has recorded thereon a reminder message, as diagrammatically illustrated by undulation 15 in Fig. 1, this reminder message being of sufficiently short duration that it can be recorded during one revolution of the record 10, i.e., within the length of the endless groove 14. Preferably, this reminder message is of somewhat shorter duration than one revolution of the record so that the recorded reminder message does not overlap the intersection 16 of the run-out groove 13 and the endless groove 14. The reminder message 15 thus constitutes a second recorded portion on the record 10 which is spaced radially inwardly from the first recorded portion 12 and is not played until the selection contained in the record portion 12 has been completed and the run-out groove 13 traversed.

In Fig. 2 there is shown a record playing arrangement wherein the record 10 may be utilized in accordance with the present invention. Referring to this figure, a rotatable turntable 20 is provided on which the record 10 may be placed and a phonograph pickup is provided with a phonograph needle 22 which is adapted to engage the grooves of the record 10. The electrical signal developed by the phonograph pickup 21 is amplified in a suitable amplifier 23, the output of the amplifier 22 being supplied to a suitable loudspeaker device 24.

Considering now the operation of the above described arrangement, when the pickup 21 is placed on the record 10 the needle 22 engages the lead-in groove 11 and is conveyed to the recorded portion 12 so that the selection recorded therein is reproduced by the loudspeaker 24. After the recorded selection 12 has been played the needle 22 engages the run-out groove 13 and is carried inwardly toward the center of the record until it engages the endless groove 14, after which the phonograph needle continues to traverse the endless groove 14 until the pickup 21 is removed from the record. Each time the needle traverses the endless groove 14 the reminder message 15 recorded therein is repeated and is reproduced through the same amplifying equipment as that employed to reproduce the recorded selection 12 so that the listener is continuously reminded that the recorded selection has been played and that the record should be changed.

The reminder message recorded in the endless groove 14 may comprise any suitable message which will serve to remind the listener that the recorded selection has been completed. For example, in the case of children's records a spoken phase such as "shut me off" may be recorded in the endless groove 14 so that after the recorded selection has been played the listener will hear "shut me off—shut me off—shut me off" at intervals corresponding to the speed of rotation of the turntable 20. If the turntable speed is 33⅓ r.p.m. this reminder message will be repeated at approximately two second intervals, whereas if the turntable speed is 78 r.p.m. the reminder message will be repeated at intervals of somewhat less than one second. The length of the reminder message is so chosen that the message is completed during one revolution of the record since the needle retraces the endless groove 14 each revolution of the record and the beginning and end of a longer message would be recorded over each other and hence would be unintelligible. While a spoken message has been suggested by way of example, it will be evident that the reminder message may, in the alternative, comprise a policeman's whistle, fire siren, or beep tone, or other signal which, by its unusual character and repetitive reproduction will remind the listener that the recorded selection has been completed and that the record should be changed.

It will be noted that the phonograph needle 22 does not engage the endless reminder message groove 14 until after the run-out groove 13 has been completely traversed. Accordingly, if the record 10 is played on an automatic record changer which is provided with a tripping mechanism of the velocity type, as are most of the record changers on the market today, the inward velocity of the pickup is substantially increased during traversal of the run-out groove 13 so that the phonograph pickup will be lifted from the record by the automatic record changer mechanism before the endless groove 14 is encountered, so that the reminder message 15 recorded therein is not reproduced during the normal record changing cycle of an automatic record changer, and, hence this reminder message does not cause any interference or disturbance if the record is changed automatically. On the other hand, if the automatic record changer has been adjusted to the manual position or is not functioning properly so that the phonograph pickup is not lifted from the record after the recorded selection has been played, the phonograph needle will be moved into engagement with the endless reminder message groove 14 and the reminder message 15 will be continuously repeated once for each revolution of the record to inform the listener that the record has been played and must now be changed manually.

In considering the manner in which the reminder message 15 may be formed in the record 10, the master plate from which the record 10 is formed may be positioned on the recording turntable and indexed with respect to a particular point on the recording turntable. The selection 12 to be reproduced is then recorded in the conventional manner and after the selection has been recorded the run-out groove 13 is formed by increasing the lag screw speed of the recording head. When the run-out groove 13 has been completed, inward movement of the recording head is terminated so that the endless groove 14 is formed in the record 10. The end of the run-out groove 13 may be indexed with respect to the recording turntable so that the reminder message 15 may be recorded directly as the groove 14 is formed and as soon as inward movement of the recording head is terminated. In the alternative, the reminder message 15 may be dubbed in after the endless groove 14 has been formed by merely noting the position of the intersection 16 and recording the reminder message in the groove 14 in such manner that it does not overlap the inner section 16. If the intersection 16 does not produce an undesired rumble or click the reminder message may be recorded without regard to the position of the intersection 16, in which case indexing with respect to the intersection 16 is unnecessary.

In some instances the phonograph record is not designed to function with the automatic tripping mechanism of an automatic record changer, in which case the alternative arrangement shown in Fig. 3 may be employed. In the embodiment of Fig. 3 the run-out groove 13 of Fig. 1 has been omitted and the terminating groove portion 30 of the recorded selection 12 may lead directly into an endless groove 31 of somewhat larger diameter than the endless groove 14 of Fig. 1, a suitable reminder message 15*a* being recorded in the endless groove 31 in the manner identical to that described above in connection with Fig. 1. In the case of the arrangement of Fig. 3 the diameter of the endless groove 31 is somewhat larger and hence affords a somewhat better frequency response for the recorded message than the endless groove 14. However, it will be understood that in either the record groove 14 or the groove 31 the reminder message need not include any high frequency components but may be limited to a few thousand cycles per second which frequency response is adequate to record a spoken message, whistle or the like.

In some types of automatic record changers the automatic tripping mechanism is designed to be actuated when the direction of movement of the pick-up is reversed. To accommodate such record changers the embodiment of Fig. 4 may be employed wherein the run-out groove 13*a* is provided with an eccentric portion 40 which will function to move the tone arm radially outwardly, i.e., the reverse of the normal inward movement of the tone arm so that the tripping mechanism is actuated and the needle automatically lifted from the record. The eccentric portion 40 terminates in an endless groove 41 within which is recorded a reminder message 42. Accordingly, if the tone arm is not lifted off the record by the automatic record changing mechanism when the eccentric groove portion 40 is traversed, the needle will engage the groove 41 and reproduce the message 42, thereby repeatedly to reproduce the message and remind the listener that the record should be changed. In the record of Fig. 4 it will be noted that either a velocity tripping mechanism or a reverse direction tripping mechanism can be actuated by the run-out groove 13*a* or the eccentric groove 40, respectively, before the reminder message is reproduced so that this message will not disturb the listener during automatic playing on any existing type of automatic record changer.

In Fig. 5 there is illustrated a further embodiment of the invention wherein the endless groove 50 is itself eccentric with respect to the center hole 51 of the record, a reminder message 52 being recorded in the endless eccentric groove 50 as described heretofore. If the tone arm is not lifted off the record by virtue of the run-out groove 53 actuating the automatic velocity trip mechanism of the changer the message 52 will be repetitively reproduced. If the changer is equipped with a reverse direction trip mechanism the eccentric groove 50 will function to actuate this trip mechanism although a portion of the message 52 may be reproduced before the needle is lifted from the record. Such undesired reproduction of the message 52 can be avoided by recording this message only in the latter portion of the groove 59 so that the message is not encountered until after the tone arm has been moved radially outwardly and the tripping mechanism actuated.

While there have been described what are at present considered to be the preferred embodiments of the invention, it will be understood that various modifications may be made therein which are within the true spirit and scope of the invention as defined in the appended claim.

What is claimed as new and desired to be secured by Letters Patent of the United States is:

A phonograph record comprising first and second recorded portions, said first portion having a selection to be reproduced recorded thereon and said second portion having a reminder message recorded thereon, said second portion being spaced radially inwardly from said first portion, and a run-out groove connecting the end of said first recorded portion to the beginning of said second recorded portion so that said reminder message is reproduced after the selection in said first recorded portion has been played and then only in the event that said run-out groove has been completely traversed, said reminder message being completely contained in an endless groove so that said message is continuously repeated as the record continues to rotate, thereby repeatedly to remind the listener that the selection has been completed.

References Cited in the file of this patent

UNITED STATES PATENTS

| | | |
|---|---|---|
| 761,846 | Messter | June 7, 1904 |
| 1,064,931 | Rabbitt | June 17, 1913 |
| 1,425,281 | Porter | Aug. 8, 1922 |
| 1,535,188 | Thompson | Apr. 28, 1925 |
| 2,142,591 | Ross | Jan. 3, 1939 |
| 2,262,732 | Gruber | Nov. 11, 1941 |
| 2,278,678 | Stone | Apr. 7, 1942 |

FOREIGN PATENTS

| | | |
|---|---|---|
| 212,884 | Switzerland | Dec. 31, 1940 |
| 62,022 | Denmark | Feb. 28, 1944 |